(12) United States Patent
Wedemann et al.

(10) Patent No.: US 9,168,481 B2
(45) Date of Patent: Oct. 27, 2015

(54) FILTER ELEMENT

(71) Applicant: MANN+HUMMEL GMBH, Ludwigsburg (DE)

(72) Inventors: Marion Wedemann, Bayreuth (DE); Gerald Rosenberg, Hoechstaedt (DE); Peter Foettinger, Bayreuth (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/193,420

(22) Filed: Feb. 28, 2014

(65) Prior Publication Data

US 2014/0174297 A1   Jun. 26, 2014

Related U.S. Application Data

(63) Continuation of application No. PCT/EP2012/066794, filed on Aug. 29, 2012.

(30) Foreign Application Priority Data

Aug. 29, 2011   (DE) .......................... 10 2011 111 368

(51) Int. Cl.
*B01D 46/00* (2006.01)
*B01D 46/52* (2006.01)
*B01D 46/10* (2006.01)

(52) U.S. Cl.
CPC .............. *B01D 46/525* (2013.01); *B01D 46/10* (2013.01); *B01D 46/521* (2013.01); *B01D 2265/04* (2013.01); *B01D 2271/02* (2013.01)

(58) Field of Classification Search
CPC ..... B01D 46/10; B01D 46/521; B01D 46/525
USPC ........ 55/385.2, 495, 497–498, 502, 510, 521, 55/482–485; 96/233
See application file for complete search history.

(56) References Cited

U.S. PATENT DOCUMENTS 3,692,184 A * 9/1972 Miller et al. .................. 210/437
5,385,668 A * 1/1995 Greenhalgh et al. ........ 210/257.1
7,833,299 B2 * 11/2010 Dawson et al. ............. 55/385.2

FOREIGN PATENT DOCUMENTS

| DE | 10235122 B3 | 1/2004 |
| DE | 10245279 B3 | 3/2004 |
| DE | 202006012854 U1 | 12/2007 |
| DE | 102006051696 A1 | 5/2008 |
| DE | 102008003931 A1 | 7/2009 |

OTHER PUBLICATIONS

German Office Action of DE 10 2011 111 368.5, dated Mar. 8, 2012.

* cited by examiner

*Primary Examiner* — Jason M Greene
*Assistant Examiner* — Karla Hawkins
(74) *Attorney, Agent, or Firm* — James Hasselbeck

(57) ABSTRACT

A filter element includes a fold pack (5) with at least one side strip (4) that connects fold ends on at least one side of the fold pack (5). The side strip (4) is connected only about a portion of the height of the fold pack therewith in such a way that the fold valleys and/or fold ridges of the fold pack are not connected with the side strip.

9 Claims, 3 Drawing Sheets

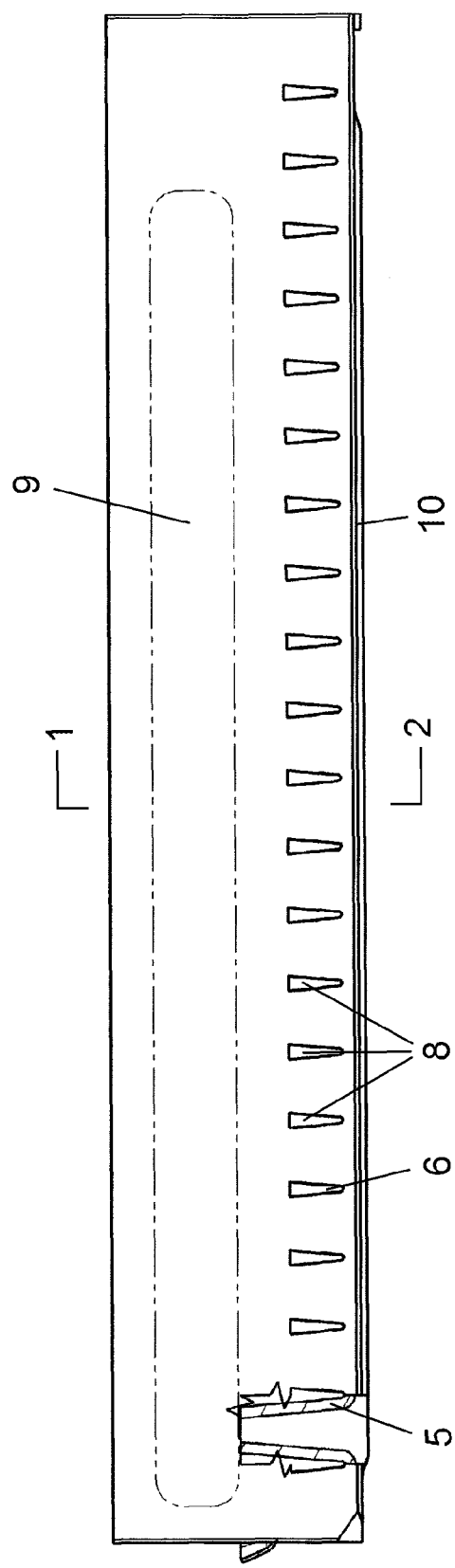

FILTER ELEMENT

CROSS-REFERENCE TO RELATED APPLICATIONS

This application is a bypass continuation application of international application No. PCT/EP2012/066794 having an international filing date of Aug. 29, 2012 and designating the United States, the international application claiming a priority date of Aug. 29, 2011, based on prior filed German patent application No. 10 2011 111 368.5, the entire contents of the aforesaid international application and the aforesaid German patent application being incorporated herein by reference.

TECHNICAL FIELD

The invention concerns a filter element, in particular a cabin filter element, in particular for a vehicle air conditioning device. The filter element serves in particular for protecting downstream components from penetrating water by targeted separation and drainage of water at the filter element.

BACKGROUND

In order to prevent water damage of components such as e.g. fan motors in the vehicle air conditioning device, there is at the moment the possibility of preventing water penetration e.g. by a water separator. The components can be protected by encapsulation which is however associated with greater space demand and costs. The overall design of the air conditioning device can be configured such that a horizontal arrangement of fan, condenser, and a filter element, positioned upright, has inflow from below so that water is drained by gravity.

DE 10131384 A1, on the other hand, discloses an air filter arrangement for a motor vehicle that comprises a filter housing and an air filter and wherein the housing comprises at least one liquid drain, downstream of the filter, wherein the arrangement comprises a filter bypass passage in order to enable liquid entering at the air inlet to flow behind the filter, or past the filter, to the liquid drain. Of course, such a bypass causes an increase of fluid flow past the filter element.

It is the object of the invention to provide a filter element in which passage of water is enabled, even for filter arrangements other than those in DE 10131384 A1, for example, filter arrangements with minimal slant angle and/or flow from top to bottom. A further object is an inexpensive and space-saving solution.

SUMMARY OF THE INVENTION

These objects are solved by a filter element, slantedly arranged in the suction duct of the air conditioning device relative to the horizontal plane, comprising a targeted integrated water drain. The water drain can be connected e.g. with a drain in the filter cover according to DE 10 2008 003 931 A1.

Following the force of gravity, water runs in the filter element according to the invention along the folds to the bottom; a water permeable area is provided thereat.

Preferably, the filter element comprises a fold pack, also referred to as fold bellows, with several folds of the filter medium for increasing the surface area, with a filter medium that is preferably hydrophobic. In fold orientation, the installation position is slanted relative to the horizontal wherein at least the drain side of the filter is designed such that it enables drainage of water without impairing the filter function.

The filter medium can be designed of a single-layer or multilayer configuration. The filter medium can comprise thermoplastic synthetic materials, preferably polyester, polypropylene or polycarbonate. The filter medium can comprise a nonwoven component, preferably of polypropylene or polycarbonate, that is responsible for particle separation and which is preferably produced by melt blown or wet spinning methods. The fibers or the nonwoven layers can be connected to each other by means of ultrasound or by a thermobonding method at least at points thereof. The filter medium can be charged electrostatically. The filter medium is preferably furnished to be water-repellant. The water-repellant properties of the filter medium can be achieved by proportions of hydrophobic fibers. The surface of the filter medium can have self-cleaning properties, for example, lotus effect. The filter medium can be a water-repellent, water jet bonded PET nonwoven. The filter medium can be furnished with an adsorber, preferably with active carbon. The fibers of one or several nonwoven layers of the filter medium can be connected with each other by wet bonding; water jet bonding; chemical, mechanical or thermal bonding. The fiber orientation of the nonwoven layer arranged at the inflow side can be arranged primarily transversely to the running direction. At least the fiber surface arranged at the inflow side can have hydrophobic properties. The property of the fiber surface can enhance gliding of the water droplets across it. The porosity of the fiber layer arranged at the inflow side can impede penetration of water droplets.

The filter element can be provided with a side strip which is not glued across the entire height of the fold pack to the latter at the outflow side. The side strip can be provided in each fold valley at the outflow side with an open contact surface relative to the side strip of at least 1 $mm^2$. The side strip can be glued only centrally in order to enable two-sided installation of the filter so that, in an individual case, a Poka-yoke solution that allows only one installation direction, can be dispensed with. The connection between the side strip and the filter medium can comprise air-impermeable and water-impermeable hot melt polymer. The hot melt application can be foamed, thereby imparting air-permeable and water-permeable properties to it. The connection between side strip and filter medium can be realized by thermal methods, preferably by ultrasonic welding. The connection between side strip and filter medium can be produced by means of a chemically reactive substance, for example, polyurethane. The height of the side strip can be greater than or identical to the total height of the fold pack.

In another embodiment, the filter element can also be formed as a fold pack in a plastic frame. The plastic frame can be injection-molded onto the fold pack in this context. Advantageously, the plastic frame then has openings from which water can exit. The filter element, in particular the cabin filter element, comprises in this context a fold pack with at least one frame part wherein the frame part in the area of the fold valleys has openings at fold ends at least on one side of the fold pack. The frame part can be an injection-molded part, for example, a part of a plastic frame.

The side strip itself can have particle-separating and/or gas-adsorbing properties. The side strip can be water-permeable wherein the water permeability can be realized by perforation. The side strip and/or the filter medium can have bio-functional properties for avoiding microbial or fungal growth. The side strip can comprise polymer materials, preferably polyester or a combination of different polymer materials. The side strip can be designed as a nonwoven or a membrane. The side strip can be embodied to be flexible or rigid, voluminous or thin, soft or hard. The side strip can have a surface with hydrophilic properties which can be achieved by a finish or by selecting suitable fiber cross-sections.

A sealing action of the filter element can be realized by means of a partial or complete end face edge seal. An injection-molded frame can be injection-molded onto the filter medium wherein the injection-molded frame provides a seal between the raw air side and the clean air side (sketch) and the water passage from fold valley to the raw air side can be produced outside of the filter frame.

BRIEF DESCRIPTION OF THE DRAWINGS

Further advantages, features, and details of the invention result from the following description in which one embodiment of the invention will be explained in more detail with the aid of the drawing. A person of skill in the art will expediently consider the features disclosed in the drawing, the description, and the claims in combination also individually and combine them to meaningful further combinations. It is shown in:

FIG. 7 an embodiment of a filter element with plastic frame.

DETAILED DESCRIPTION

Figure 1:
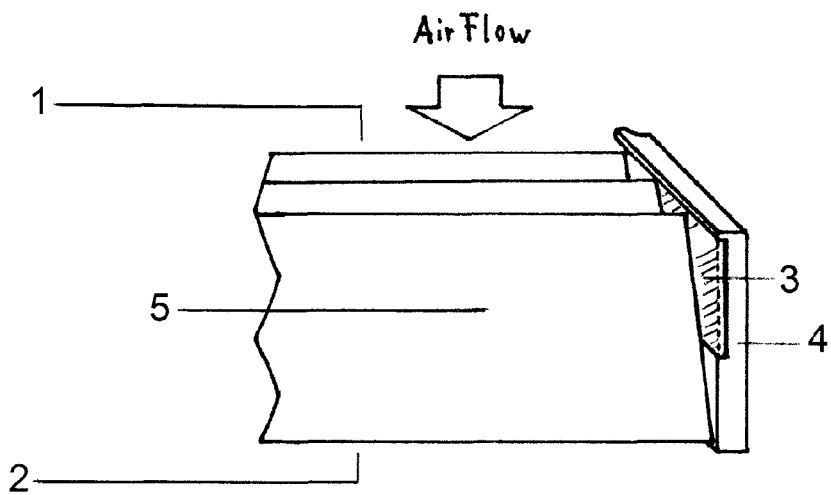
FIG. 1 a detail of the filter element.

FIG. 1 shows a detail of a filter element. Inflow into the filter element is at the raw side 1. A fold pack 5 of pleated filter medium with fold valleys and fold ridges is limited at the fold ends by a side strip 4. The side strip 4 is connected only about a portion of its height with the fold ends. For example, an area of 1 to 5 mm from the bottom side of the fold pack 5 is not connected with the side strip. In this area, water coming from the raw side 1 and collecting in the fold valleys can penetrate to the clean side 2. In the area 3, the side strip can be glued completely across the fold ends or can be connected only along the fold contour.

Figure 2:
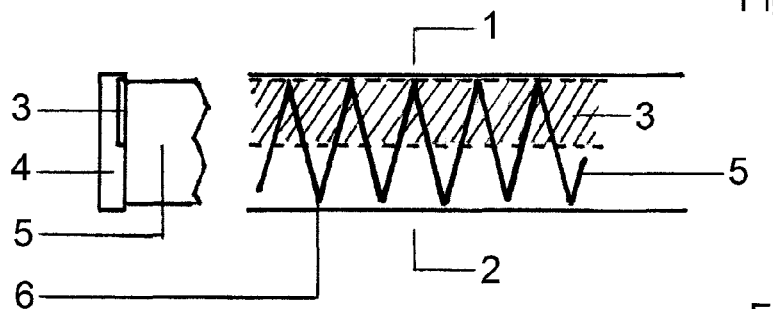
FIG. 2 an embodiment with a side strip.

FIG. 2 shows the adhesive bond of the side strip 4 with the fold ends in detail.

Figure 3:
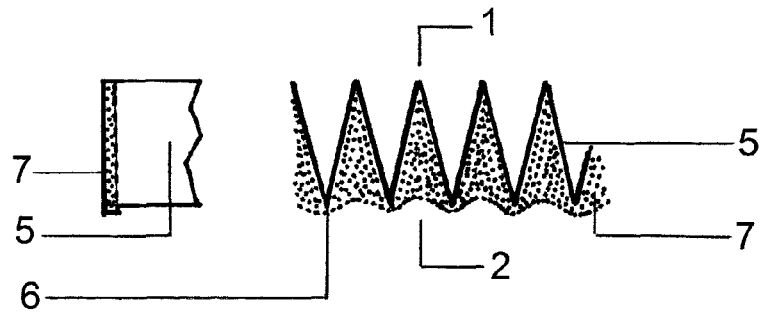
FIG. 3 an embodiment with end face edge adhesive bond.
Figure 4:
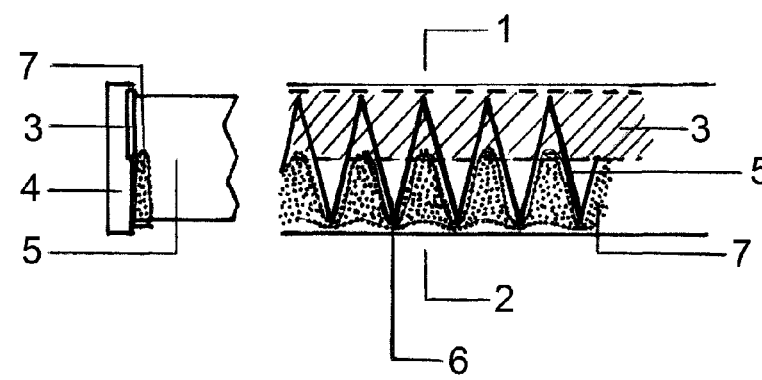
FIG. 4 an embodiment with a combination of side strip and end face edge adhesive bond.

FIG. 3 shows sealing of the fold ends of the fold pack 5 on the clean side 2 by means of an end face edge adhesive bond 7. Water from the raw side 1 can penetrate in the fold valleys at the point 6 to the clean side 2 because there is no complete seal-tightness provided due to the abutment of only the fold ends at a housing. Possible is also the combination of an end face edge adhesive bond 7 with a side strip 3 as shown in FIG. 4. Again, water can pass in the fold valley 6 from the raw side 1 to the clean side 2 because no strong sealing action is provided here.

Figure 5:
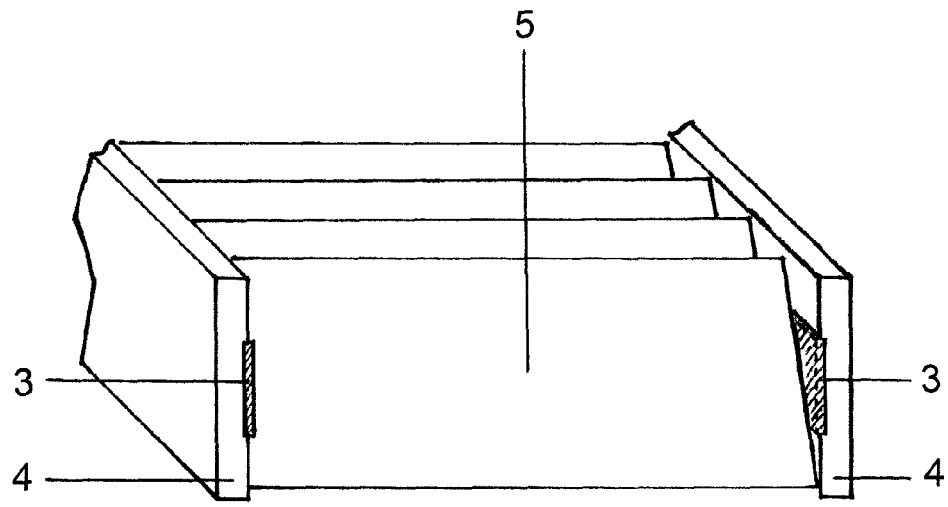
FIG. 5 a detail of a filter element.

In FIG. 5 a solution is shown in which a side strip 4 is connected only centrally with the fold ends of the fold pack 5. In this way, drainage of water is possible in different installation positions of the filter element.

Figure 6:
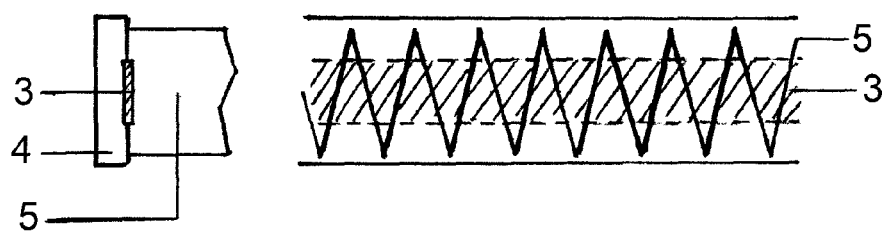
FIG. 6 the side strip course of the filter element of FIG. 5 in detail.

FIG. 6 shows the adhesive bond of the side strips with the fold ends in detail.

FIG. 7 shows an embodiment of a filter element with plastic frame. Water from the raw side 1 can pass in the fold valleys at point 6 to the clean side 2 because there is no complete seal-tightness provided due to the openings 8 in the plastic frame. Alternatively, the filter element of FIG. 7 can also be sealed at the lower end 10 that is adjacent to the side of the frame part 9 which has openings 8 so that water can be discharged at the raw side.

The invention claimed is:

1. A filter element comprising:
a fold pack of a folded filter medium having a plurality of folds, the fold pack including:
an inlet flow face defined by filter medium fold peaks at a raw side of the fold pack;
an outlet flow face defined by filter medium fold valleys at a clean side of the fold pack;
a first fold pack side at a first fold ends of the folded filter medium;
an opposing second fold pack side at opposing second fold ends of the folded filter medium;
wherein the fold peaks and fold valleys extend across filter medium from the first fold pack side to the second fold pack side;
a side strip secured onto fold ends at the first or second fold pack side of the fold pack;
wherein the side strip that connects fold ends on at least one of the fold pack sides of the fold pack;
wherein the fold pack has a height defined by the distance between the inlet flow face and the outlet flow face;
wherein the side strip is connected only about a portion of the height of the fold pack therewith in such a way that the fold valleys and/or fold ridges of the fold pack are not connected with the side strip, such that liquids are permitted to pass between the not connected fold valleys and/or fold ridges and the side strip.

2. The filter element according to claim 1, wherein height of the side strip is greater than the height of the fold pack.

3. The filter element according to claim 1, wherein the side strip is not connected with the fold pack in an area of 1 mm to 5 mm of the fold ridges and/or the fold valleys of the fold pack.

4. The filter element according to claim 3, wherein, in the area that is not connected with the side strip, the folds of the fold pack are at least partially connected with an end face edge adhesive bond precisely at one side.

5. A filter element comprising
a fold pack of a folded filter medium having a plurality of folds, the fold pack including:
an inlet flow face defined by filter medium fold peaks at a raw side of the fold pack;
an outlet flow face defined by filter medium fold valleys at a clean side of the fold pack;
a first fold pack side at a first fold ends of the folded filter medium;
an opposing second fold pack side at opposing second fold ends of the folded filter medium;
wherein the fold peaks and fold valleys extend across filter medium from the first fold pack side to the second fold pack side;
at least one frame part secured onto fold ends at the first or second fold pack side of the fold pack;
wherein the frame part in the area of the fold valleys at fold ends has openings extending through the frame part at least on one side of the fold pack.

6. The filter element according to claim 5, wherein the frame part is part of a plastic frame.

7. The filter element according to claim 6, wherein the plastic frame is injection-molded onto the first or second fold pack side of the fold pack.

8. An air conditioning device or cabin air supply device of a motor vehicle, comprising
a flow passage;
a filter element arranged in the flow passage;
wherein the filter element includes a fold pack of a folded filter medium having a plurality of folds, the fold pack including:
an inlet flow face defined by filter medium fold peaks at a raw side of the fold pack;
an outlet flow face defined by filter medium fold valleys at a clean side of the fold pack;
a first fold pack side at a first fold ends of the folded filter medium;
an opposing second fold pack side at opposing second fold ends of the folded filter medium;
wherein the fold peaks and fold valleys extend across filter medium from the first fold pack side to the second fold pack side;
a side strip secured onto fold ends at the first or second fold pack side of the fold pack;
wherein the side strip that connects fold ends on at least one of the fold pack sides of the fold pack;
wherein the fold pack has a height defined by the distance between the inlet flow face and the outlet flow face;
wherein the side strip is connected only about a portion of the height of the fold pack therewith in such a way that the fold valleys and/or fold ridges of the fold pack are not connected with the side strip, such that liquids are permitted to pass in a passage between the not connected fold valleys and/or fold ridges and the side strip;
wherein the filter element is mounted at a slant to the horizontal plane in the flow passage in such a way that the fold valleys of a fold pack of the filter element are slanted so that water in the fold valleys can drain, following the force of gravity, to pass in the passage between the not connected fold valleys and/or fold ridges and the side strip;
wherein the water can pass between the fold ends and the flow passage from a raw side in front of the filter element to a clean side downstream of the filter element.

9. The air conditioning device or cabin air supply device according to claim 8, wherein the fold pack has folds on the clean side, but not at the raw side, are provided with an end face edge adhesive bond.

\* \* \* \* \*